United States Patent [19]

Goodwin et al.

[11] Patent Number: 4,962,403

[45] Date of Patent: Oct. 9, 1990

[54] ADJUSTING PHOTOGRAPHIC PRINTER COLOR EXPOSURE DETERMINATION ALGORITHMS

[75] Inventors: Robert M. Goodwin; Joseph A. Manico, both of Rochester, N.Y.

[73] Assignee: Eastman Kodak Company, Rochester, N.Y.

[21] Appl. No.: 448,798

[22] Filed: Dec. 11, 1989

[51] Int. Cl.$^5$ .............................................. G03B 27/80
[52] U.S. Cl. ........................................ 355/38; 355/68; 355/77
[58] Field of Search .............................. 355/38, 68, 77

[56] References Cited

U.S. PATENT DOCUMENTS

| | | | |
|---|---|---|---|
| 4,159,174 | 6/1979 | Rising | 355/38 |
| 4,526,462 | 7/1985 | Hope et al. | 355/38 |
| 4,845,551 | 7/1989 | Matsumoto | 355/38 X |

Primary Examiner—Michael L. Gellner
Assistant Examiner—D. Rutledge
Attorney, Agent, or Firm—Raymond L. Owens

[57] ABSTRACT

This invention relates to a printing system which makes use of a color exposure determination algorithm. If the printing system permits operator controlled reprinting, then the algorithm's coefficients may be optimized by reprinting negatives using exposures that have been precisely corrected by the operator. This invention teaches that a most efficient way to select the negatives for reprinting is to chose those which lie in two ranges of the "hat" statistic for any or all of the color exposure determination algorithm equations used to make the print. It also teaches how to automatically re-optimize the algorithm coefficients on a periodic basis using data collected automatically during the reprinting operation.

7 Claims, 4 Drawing Sheets

ADJUSTING PHOTOGRAPHIC PRINTER COLOR EXPOSURE DETERMINATION ALGORITHMS

FIELD OF THE INVENTION

This invention relates to methods for controlling the exposure amount of negatives in a photographic printer by automatically adjusting the color exposure determination algorithm using information obtained from automatically selected negatives which are then reprinted at optimum density and color balance.

BACKGROUND OF THE INVENTION

In the photographic printing art in order to automatically print color negatives and produce color prints, color exposure determination algorithm equations compute red, green and blue exposures for each negative. The automatic calculation of these exposures is based upon the densities measured in the negative to be printed.

The equations used in the algorithms are based on prior experience gained by printing many typical consumer negatives. One of the preferred methods used to convert that experience into equation form is least squares regression analysis. Least squares regression analysis may be formulated using matrix notation in the following way.

The densities measured in each negative to be printed are combined to form quantities called predictors. The average density could be one such predictor, and the maximum and minimum densities may be other such predictors. The predictors useful in calculating the required exposure are determined by those skilled in the art. The use of this invention is in no way limited to any particular set of predictors. For convenience they may be represented by names such as $x_1$, $x_2$ and $x_3$. The following description uses three predictors, but any number of predictors may be employed. The predictor values from a series of negatives can be arranged in a matrix form which includes a column of 1's to represent the balance coefficients (which are later adjusted) in the equation. Such a matrix for N frames would take the form:

$$X = \begin{bmatrix} 1 & x_{11} & x_{12} & x_{13} \\ 1 & x_{21} & x_{22} & x_{23} \\ - & - & - & - \\ - & - & - & - \\ 1 & x_{j1} & x_{j2} & x_{j3} \\ - & - & - & - \\ - & - & - & - \\ 1 & x_{N1} & x_{N2} & x_{N3} \end{bmatrix}$$

where the first subscript represents the negative number in the sequence of N negatives and the second subscript stands for the predictor number as described above.

If the rows and columns of the matrix X are interchanged, then the matrix formed is the transpose of X, designated X'. The product of the matrices X'X is known as the sums of squares and cross products matrix.

The exposure values calculated by the color exposure determination algorithm equations are known to those skilled in regression analysis as the predicted response variables, any one of which may be designated as $\hat{y}$. The exposure values which are determined by an operator and which result in the optimum prints from negatives are known as the aim responses, the corresponding one of which may be called y. The predicted exposures, and the aim exposures, $\hat{y}$, from the same series of N negatives as described above may be collected into two column vectors which take the form:

$$Y = \begin{bmatrix} y_1 \\ y_2 \\ - \\ - \\ y_j \\ - \\ - \\ y_N \end{bmatrix} \quad Y = \begin{bmatrix} y_1 \\ y_2 \\ - \\ - \\ y_j \\ - \\ - \\ y_N \end{bmatrix}$$

where the subscript represents the negative number in the sequence of N negatives.

Regression theory teaches that the vector of predicted response variables is computed from the equation:

$$\hat{Y} = X[X'X]^{-1}X'Y \qquad (1)$$

where
  $[X'X]^{-1}$ is the inverse of the sums of squares and cross products matrix.

The matrix products $[X'X]^{-1} X'Y$ give the least squares estimates of the algorithm coefficients. Thus:
  $\hat{b} = [X'X]^{-1} X'Y$ and
  $\hat{Y} = Xb$
where
  b = is the column vector of color exposure determination algorithm equation coefficients.

Furthermore, equation (1) may be split up in a different manner to define the "hat" matrix:
  $H = X(X'Y)^{-1}X'$ where
  H is called the "hat" matrix because it puts the "hat" on Y or converts Y to $\hat{Y}$. This is also called an orthogonal projection operator.

The diagonal elements of the hat matrix are given by:

$$h_i = x_i [X'X]^{-1} x_i' \qquad (2)$$

where
  $h_i$ is the diagonal element of the ith row from the hat matrix,
  $x_i$ is the ith row of predictor values from the X matrix.

Both $h_i$ and $x_i$ are values associated with the ith negative out of the collection of N negatives. The average value of $h_i$ for a collection of N negatives is $\overline{h_i} = p / N$ where
  p is the number of degrees of freedom used in the regression (i.e., the number of columns in the X matrix).

As is well known to those skilled in regression analysis the $h_i$'s have important diagnostic properties. In particular, when the value of $h_i$ exceeds some multiple of p / N, such as 2p / N, then the negative is said to have high leverage (influence) in determining the coefficients, $\hat{b}$.

All of the preceeding are well known to those skilled in regression analysis. This analysis is described as if there were a single set of predictors and a single response, but it should be understood that the same calculations are repeated for each equation used in the exposure determination algorithm. Thus, if there were three equations required to compute the red, green and blue exposures, then there would be three sets of coefficients, $\hat{b}$, three hat matrices, three hat statistics and all the calculations would be done three times. If the negatives were split into two groups and four equations were required, then the calculations would be done four times. If more groups and thus more equations were required, then more sets of calculations would be done.

A percentage of negatives printed by any automatic algorithm will be incorrectly printed. This percentage will be increased by a mismatch between the characteristics of the negatives being printed, the film or paper contrast, the preferences of the photofinishing operator and the coefficients of the predictors used in the algorithm. The negatives can, for example, due to seasonal variations, contain a higher percentage of high contrast flash scenes or low contrast snow scenes than the number for which the algorithm coefficients are optimum. Alternatively, the operator may run the process at a higher or lower contrast than that for which the algorithm coefficients are optimum. In addition the operator may prefer, for example, a different compromise for printing underexposed negatives than would result using the coefficients of the color exposure determination algorithm equations. In any event, an automatic algorithm performs better if its coefficients are calculated so as to provide optimum performance for the printing situation.

The resources required to develop and optimize a color exposure determination algorithm are substantial. These include means to collect a large number of representative negatives (over 1000 for each film type), means to scan (densitometer) and store the density data from them, means to print them and store the printing information, means to judge the prints and make the necessary corrections from the first printing, means to reprint the negatives until the optimum print is made, means to calculate the predictor values from the density data, means to collect and assemble the predictor values along with the optimum printing conditions data and means to analyze this data using conventional statistical methods such as regression analysis. In principle each photofinishing installation could undertake their own algorithm development and optimization by assembling the capabilities described above. In practice this is not practical.

SUMMARY OF THE INVENTION

The object of this invention is to significantly reduce the work required at an individual photofinishing station to optimize their color exposure determination algorithm equations. Furthermore, it is another object of this invention to make the adjustments in a most efficient way. This efficiency results from taking a nonconventional view of the significance of the hat statistic $h_i$. Most statisticians use $h_i$ as a diagnostic tool in examining regression model robustness. This means that they look at data points which have relatively high $h_i$'s with considerable suspicion. However, as will be seen in this invention, negatives which give rise to relatively high $h_i$'s are viewed with gratitude because of their relative efficiency in the accurate determination of the algorithm coefficients, and any discounting of them is based solely on the content of the print made from them.

According to this invention, as each negative is scanned and printed, the hat statistic is calculated, each negative which lies within an adjustable range for the statistic will be selected for precise reprinting and, based on the reprinting, the algorithm coefficients will be optimized. More particularly, in accordance with this invention, a method of controlling the exposure of negatives in a photographic printer, comprises the steps of:

(a) scanning each negative to provide red, green and blue density information;

(b) producing prints of such negatives employing such density information in a color exposure determining algorithm having at least one neutral density equations with coefficients and at least two chromaticity equations with coefficients;

(c) computing a statistic from each negative's density data based on the diagonal element from the algorithm's hat matrix;

(d) alerting the operator that a negative should be critically reprinted whenever its computed statistic lies within an adjustable selection range;

(e) automatically identifying the prints made from the negatives whose computed statistic lies within the adjustable "selection" range.

(f) selecting identified prints and providing precise density and color balance corrections;

(g) reprinting negatives from the selected identified prints using the precise corrections;

(h) automatically examining all reprinted negatives for suitability of use for recalculating the algorithm's coefficients and selecting those negatives which lie in one adjustable and one nonadjustable range for the hat statistic;

(i) computing the X'X, the X'Y and Y'Y matrices for all the selected negatives;

(j) adding an adjustable fraction of the new X'X the new X'Y and the new Y'Y matrices to the corresponding current matrices and recomputing the algorithm coefficients, $\hat{b}$ when the number of new frames eceeds an adjustable number;

(k) installing and using, the new coefficients in the corresponding equations; and (l) using the newly formed X'X matrix to continue to compute the hat statistic and begin to accumulate new values for the new X'X, the new X'Y and the new Y'Y matrices.

DETAILED DESCRIPTION OF THE PREFERRED EMBODIMENT

Figure 1:
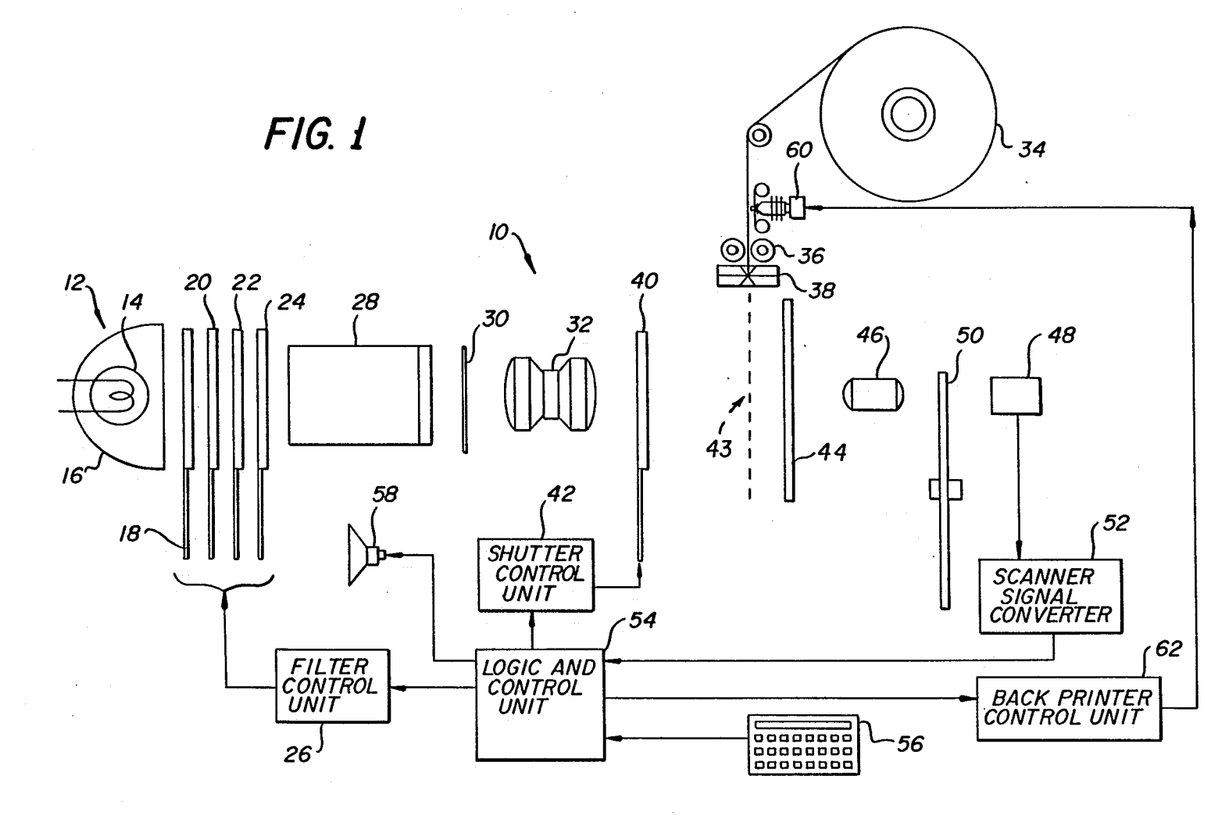
FIG. 1 is a schematic illustrating an embodiment of the photographic printing apparatus in accordance with the present invention.

Referring to FIG. 1 there is shown a schematic of a photographic printer 10. The printer includes a light source 12. Source 12 includes a lamp 14 and a reflector 16. The lamp can conveniently be provided by a tungsten lamp.

Light from lamp 14 passes through a balancing filter 18 and selectively through cyan (C) 20, magenta (M) 22, and yellow (Y) 24 cutoff filters. The position and control of these filters is provided by a conventional filter control unit 26. The operation of these filters is conventional and so will only be briefly described.

The cyan, magenta and yellow cutoff filters are used to independently control the red, green, and blue exposure. The printing lamp 14 produces white light and as the cutoff filers enter the beam, the red, green and blue components of the light are blocked or "cutoff" from the photographic paper.

An integrator and diffuser 28 shown as a single unit, concentrates and diffuses light which has passed through the filters so as to provide a uniform intensity of light over a predetermined area on a photographic negative 30. Light which has illuminated the negative 30 is collected by a printing lens 32 which focuses such light onto the photographic paper disposed at a paper plane 43 shown by a dotted line. The photographic paper is delivered from roll paper drive rollers 36. After exposure, the exposed paper is severed by a paper cutter 38. The exposed paper is then delivered to a development station. Before the paper is cut, the exposure is terminated by a shutter 40 which is moved by a conventional shutter control 42 to a position where it blocks light from the negative 30. The shutter 40 can, as well understood in the art, be located at a different position along the optical path.

Thereafter, a new negative 30 is introduced into the light path by means not shown. The shutter 40 is opened and the light from the lens 32 is projected onto a Fresnel lens 44 which is also located at approximately the paper plane.

An image of the negative is formed on the Fresnel lens 44. This image is the subject for the scanner lens 46 which projects it onto photodiode 48. A scan disk 50 is driven at a constant rate and has a plurality of apertures and filters. Each disk aperture is provided with red, green, or blue filters. As the disk is rotated and each aperture passes into the light path, a color matrix of density points from the negative is projected onto the surface of the photodiode 48. These individual points are converted by the photodiode 48 to a series of voltages which are provided to the scanner signal converter 52. The converter 52 will be understood to include an appropriate amplifier circuit. Amplified signals are then converted by an analog to digital converter to digital signals, each with a numeric value corresponding to red, green or blue density components of a pixel of the negative. These values are provided to a logic and control unit 54 which includes memory and a microprocessor having a color exposure determining algorithm embodied in a program. These digital numbers are, of course, in log space as will be well understood to those skilled in the art. $E_R$, $E_G$ and $E_B$ are used by the logic and control unit to cause the shutter control unit 42 to adjust the shutter 40 to control the amount of exposure. Also the program causes the filter control unit 26 to adjust the individual red, green and blue exposures by positioning the cutoff filters 20, 22 and 24. For example, an over exposed (dark) negative would require a longer than normal overall exposure controlled by the shutter 40 and film and scene characteristics would be compensated for by the individual red, green and blue exposures produced by the cutoff filters 20, 22 and 24.

One such algorithm is illustrated in Tables 1, 2, and 3. The red, green, and blue digital components of a pixel are substituted into the three equations shown in Table 1. Commonly assigned U.S. Pat. No. 4,159,174 discusses color determination in detail and its disclosure is incorporated by reference therein. See column 9 of such patent, for example. Neutral (N), Green-Magenta chromaticity (G,M) and Illuminant-chromaticity (ILL) coordinates are computed for each pixel from its red, green, and blue components. Thereafter Neutral exposure ($E_N$), Green-Magenta ($E_{G,M}$) and Illuminant exposure ($E_{ILL}$) are computed for the negative.

TABLE 1

$$\begin{vmatrix} N \\ G,M \\ ILL \end{vmatrix} = \begin{vmatrix} 1/\sqrt{3} & 1/\sqrt{3} & 1/\sqrt{3} \\ -1/\sqrt{6} & 2/\sqrt{6} & -1/\sqrt{6} \\ -1/\sqrt{2} & 0 & 1/\sqrt{2} \end{vmatrix} * \begin{vmatrix} R \\ G \\ B \end{vmatrix}$$

TABLE 2

$$\begin{vmatrix} E_R \\ E_G \\ E_B \end{vmatrix} = \begin{vmatrix} 1/\sqrt{3} & -1/\sqrt{6} & -1/\sqrt{2} \\ 1/\sqrt{3} & 2/\sqrt{6} & 0 \\ 1/\sqrt{3} & -1/\sqrt{6} & 1/\sqrt{2} \end{vmatrix} * \begin{vmatrix} E_N \\ E_{G,M} \\ E_{ILL} \end{vmatrix}$$

TABLE 3

Neutral Density Calculation ($E_N$)

If ($N_{max} - N5\%$) is less than 1.8 then the negative is low contrast and equation (3) is used:

$$E_N = \text{Bal-Low} + 0.33 * N_{ave} + 0.30 * N_{max} + 0.35 * N_{min} \quad (3)$$

otherwise the negative is high contrast and equation (4) is used.

$$E_N = \text{Bal-Hi} + 0.30 * N_{ave} + 0.35 * N_{max} + 0.29 * N_{min} \quad (4)$$

where
  $E_N$: calculated Neutral log Exposure
  $N_{ave}$: average of the Neutral density pixels for a negative
  $N_{max}$: maximum Neutral density pixel of a negative
  $N_{min}$: minimum Neutral density pixel of a negative
  $N5\%$: the Neutral density below which 5 percent of the individual (N) neutral density pixels of a negative fall
  Bal-Low: density balance coefficient for the low contrast negatives of equation (3)
  Bal-Hi: density balance coefficient for the high contrast negatives of equation (4)

Color Chromaticity Calculations ($E_{G,M}$ and $E_{ILL}$)

$$SAT = (G,M_{ave} - G,M_{ctr})^2 + (ILL_{ave} - ILL_{ctr})^2 \quad (5)$$

$$WGT = 1.0 - 40 * SAT$$

If WGT less than $WGT_{min}$ then $WGT = WGT_{min}$ $$E_{G,M} = \text{Bal-G,M} + 0.90 * WGT * (G,M_{ave} - G,M_{ctr}) \quad (6)$$

$$E_{ILL} = \text{Bal-ILL} + 0.96 * WGT * (ILL_{ave} - ILL_{ctr}) \quad (6)$$

where
  $E_{G,M}$: calculated Green magenta log Exposure
  $E_{ILL}$: calculated Illuminant log Exposure
  $G,M_{ave}$: average of the Green magenta density pixels for a negative G,M$_{ctr}$: Population Average of the Green magenta component of the densities ILL$_{ave}$: average of the Illuminant density pixels for a negative ILL$_{ctr}$: Population Average of the Illuminant component of the densities WGT$_{min}$: minimum value (determined experimentally) for de weighting function (ex. 0.2)

Bal-G,M: G,M balance coefficient of equation (6)

Bal-ILL: ILL balance coefficient of equation (7)

wherein the term Population Average refers to the average density from many negatives (such as 1000 or more) of the same film type. A number of quantities' averages are computed in the logic and control unit 54 for each of the numbers computed from Table 1.

Turning now to Table 3, E$_N$ is computed using either equations (3) or (4). It is to be noted that Bal-Low, Bal-Hi and all the coefficient values (i.e. 0.33, 0.30, 0.35 from equation (3) as well as 0.30, 0.35 and 0.29 from equation (4)) may be adjusted in accordance with this invention on the basis of negatives which are reprinted with the corrections (if any) required to make excellent prints from them. Likewise, the coefficients Bal-G,M and 0.90 from equation (6) and Bal-ILL and 0.96 from equation (7) in Table 3 may also be adjusted in accordance with this invention if the predictor with the coefficient 0.90 in equation (6) is defined to be WGT* (G,M$_{ave}$−G,M$_{ctr}$) and if the predictor with the coefficient 0.96 in equation (7) is defined to be WGT* (ILL$_{ave}$−ILL$_{ctr}$).

Figure 2:
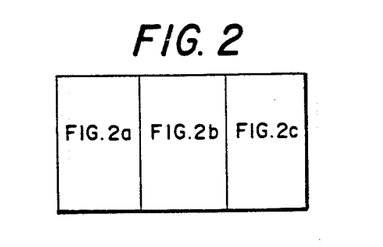
FIG. 2 is a flow chart illustrating an embodiment of the control logic followed by the logic and control unit 54 shown in FIG. 1.
Figure 2A:
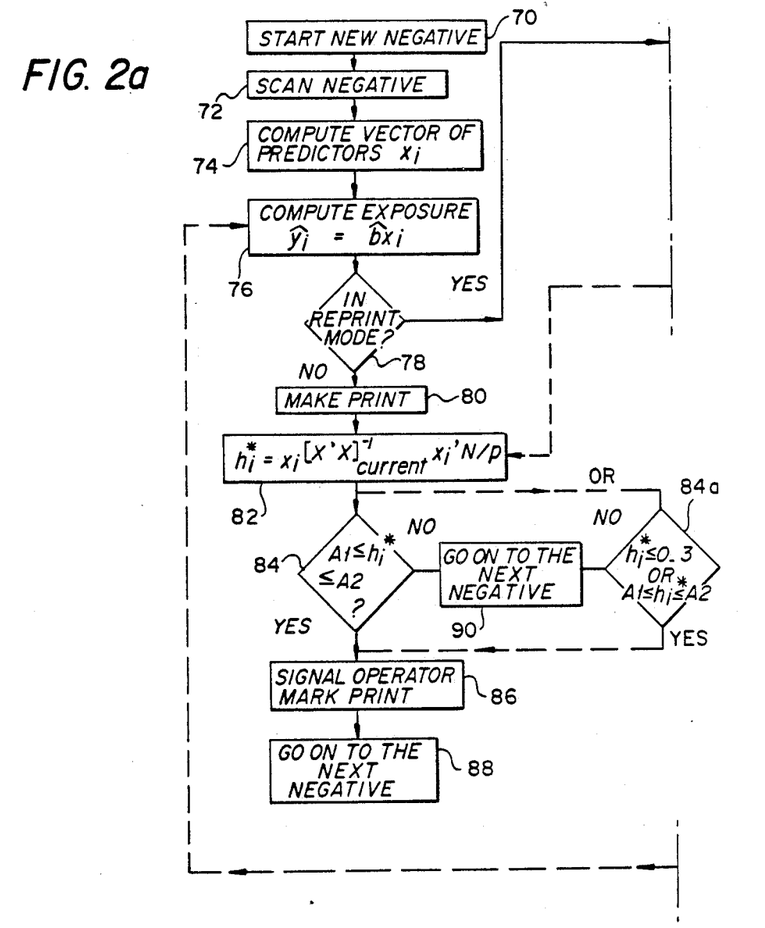

Referring to FIG. 2, the calculations illustrated are for a single exposure equation but are repeated for each exposure equation. The logic flow starts at Block 70 with the appearance of a new negative ready for printing. Block 72 represents the scanning of the negative as previously described. Block 74 represents the calculation of the predictors such as N$_{ave}$, N$_{max}$ and N$_{min}$. After E$_N$, E$_{G,M}$ and E$_{ILL}$ are computed for the negative by the color exposure determination algorithm in Block 76, and as part of that calculation, these values are substituted into the equations of Table 2 and the exposures for red (E$_R$), green (E$_G$) and blue (E$_B$) are computed.

In Block 78 the control program recognizes if the printer is in the reprint mode or not. If not, the command is given in Block 80 to make a print based only on the exposures calculated by the color exposure determination algorithm of Block 76.

Besides calculating the exposure values, control unit 54 of FIG. 1 also stores a series of separate X, Y and [X'X]$^{-1}$ matrices, one set for the predictors used in each exposure equation. These matrices are referred to as the current matrices. The matrices may be kept directly, or they may be kept in a usefully equivalent product form of X'X, X'Y and Y'Y. Initially these current matrices are supplied along with the algorithm used in control unit 54 by its manufacturer. As shown in Block 82 after each new negative's exposures are calculated, the control unit calculates the h statistics using the current matrix corresponding to the predictors used to compute the exposures. If the negatives are split into two groups as is done when computing E$_N$ using equation (3) or (4) from Table 3, then the h statistic is computed using the inverse sums of squares and cross products matrix corresponding to the coefficients for the equation which was chosen to calculate the exposure. The h$_i$ values are normalized by dividing them by their average value. Thus, a normalize hi statistic, h$_i$*, is generated by:

$$H_i^* = h_i [N / p].$$

Blocks 84 shows that when any of the h$_i$* statistic values lie in an operator controlled range, the operator is alerted in Block 36 by a signal from an auditory or visible signal means 58 shown in FIG. 1 and the negative is automatically identified by backprinting a special code on the print made from that negative using backprinter 60 which is driven by means 62 shown in FIG. 1. Or in lieu of backprinting, the paper advance may be extended by a fraction of an inch to identify the selected image by its offset length. This latter method would make it very easy for the operator to find the print from the identified negative, and it would encourage him to reprint the negative instead of having to trim the offset. The lower limit for the range, A1, shown in Block 84, which, for example, could be 2 or 3, is set to control the number of negatives identified, the higher it is, the fewer negatives will be identified. The upper limit, A2, shown in Block 84 which, for example, could be 7 or 8, is set to exclude odd or unprintable negatives from being identified. In any case, the operator has absolute veto over the final selection of any negative. By simply refusing to reprint the negative, it is excluded from the algorithm improvement process. The operator might decide not to select to reprint a negative because, for instance, it was too blurred, or too strange subject matter, or a too poorly lighted exposure to be able to accurately judge its ideal color and density balance. Furthermore, if the operator does not wish to operate the printer in its algorithm optimization mode, then he may turn off the process by adjusting the acceptance range shown in Block 84 to 0 width.

After the operator is signaled and the print is marked in Block 86, the control system is readied for the next negative in Block 88. Otherwise, the control system is readied for the next negative in Block 90.

Assuming the operator does wish to do the reprinting necessary to improve the performance of the algorithm, he marks an identified print which he will use with as precise color and density corrections as possible.

The corresponding negative is reloaded into the printer, as if it was a new negative. The control logic begins again at Block 70 and progresses as before to the decision made in Block 78. Returning to FIG. 1, the operator, by means of keyboard 56, signals the logic and control unit 54 to operate in a reprint mode. Control is then passed to Block 90 of FIG. 2b, and control unit 54 of FIG. 1 accepts the balance corrections made by the operator using keyboard 56. In Block 92 oF FIG. 2b, the corrected exposure is calculated, and the command is given in Block 94 to make a print based on these operator corrected exposures.

The h$_i$* statistic is again calculated in Block 96, and its value is compared to two ranges in Block 98. In order to account for variability in the scanner and in the position of the negative in the scan gate and thus to insure that the negative still falls in the adjustable range, control unit 54 compares its value to a range, from A1' to A2', which has been extended by a fixed amount, which may, for example, be 0.1 or 0.2, at both ends. By using this automatic increase in the acceptance range, the negative will usually still be selected and used in the optimization process.

In addition to the negatives selected for optimum h$_i$* values, other frames will have to be made over because they do not pass the operator's acceptance criterion. When these ordinary reprints have h$_i$* values below 0.3 they are also selected automatically in Block 98 in order to maintain a good overall balance for the population of negatives being printed. If the operator does not ordinarily reprint any negatives, then control logic in alternative Block 84a must have also randomly selected an operator adjustable fraction of those negatives with $h_i^*$ values below 0.3. If the negative is not selected in Block 98, then the control system is readied for the next negative in Block 100.

Figure 2B:
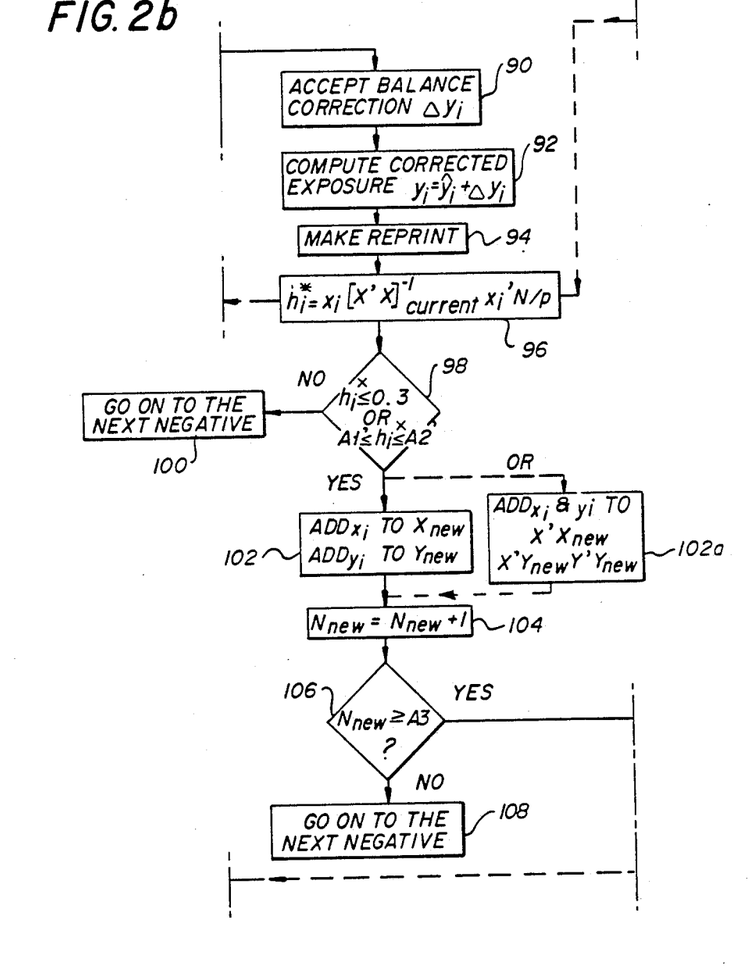

Continuing in FIG. 2b to Block 102, when a negative is selected for the optimization process, the predictor values for the selected reprint frame are added to the new X matrices corresponding to the equations to be used to make the reprint. Or the predictor values are used to add to the equivalently useful corresponding X'X matrix stored in unit 54 as shown in Block 102a. Also in Block 102, the optimum exposure values are added to the corresponding new Y matrices. Or, as shown in Block 102a, the optimum exposure values and its set of predictors are added to the equivalently useful corresponding new X'Y, and Y'Y matrices.

The number of new frames is incremented in Block 104, and the number is compared to an operator adjustable number, A3, which may be, for instance, 100 in Block 106. If the number does not exceed the operator adjustable limit, then the control system is readied for the next negative in Block 108.

If the number of new frames does equal, or exceed, the operator adjustable limit in Block 106, and if the X and Y matrices are being stored in control unit 54 of FIG. 1, then the following matrix quantities are computed in Block 110:

X'X new
X'Y new
Y'Y new.

Figure 2C:
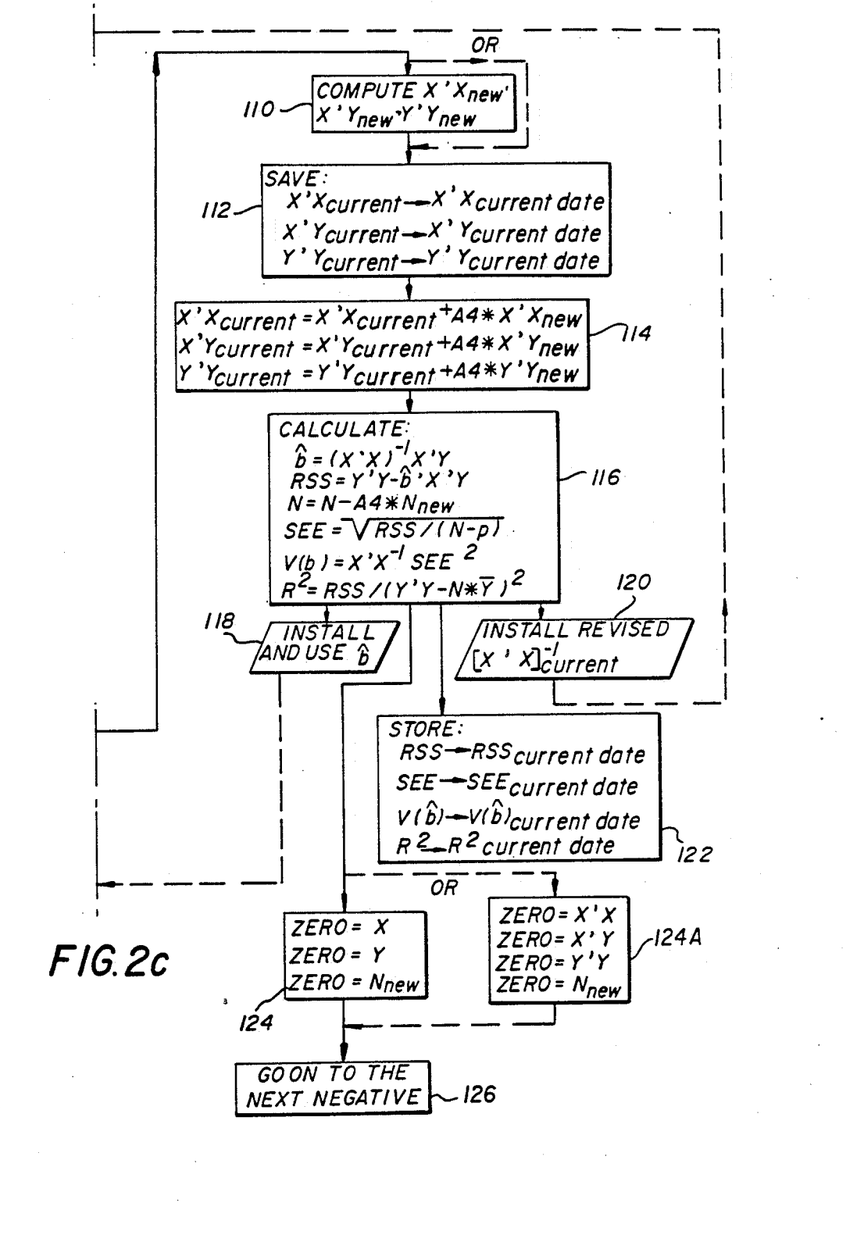

As shown in FIG. 2c, if the new X'X, X'Y, and Y'Y matrices have been stored and incremented all along, then it is not necessary to recompute them in Block 110 when the number of entries reaches the operator adjustable number of new frames. In either case, Block 112 shows that a copy of the current matrices is kept for back up, and then control unit 54 adds an operator adjustable fraction, A4, of each of these new matrices, element by element, to the corresponding values of the current matrices in Block 114. This latest sum of new and current matrices then becomes the updated current matrices.

If the operator wishes to obtain a quick improvement to the algorithm at the risk of making a suboptimum improvement, then he can chose to update the current matrices with the new matrices by setting A3 in Block 106 to a lower value, and he can choose to add a greater fraction of the new matrices to the current matrices (including a fraction exceeding 1) by increasing A4 in Block 114. On the other hand, if the operator wishes to be more cautious, he may set A3 in Block 106 to a higher value, and he may set A4 in Block 114 to a smaller value.

In any case the number of frames associated with the updated matrices will be given by the value of the first element in first row of the updated X'X matrix.

Referring again to FIG. 2c, once the above three updated current matrices are computed, the following additional calculations are made in Block 116:

$\hat{b} = [X'X]^{-1} X'Y$
RSS $Y'Y - \hat{b}'X'Y$
$N = N_{current} + A4^*N_{new}$
SEE $= \sqrt{[RSS / (N-p)]}$
$V(\hat{b}) = [X'X]^{-1}$ SEE$^2$
$R^2 = RSS / (Y'Y - N^*\bar{Y}^2)$ where
RSS is the residual sums of squares of the regression error,
N is the total number of frames after the selected fraction of the new frames ($N_{new}$) are added to the current number of frame ($N_{current}$),
SEE is the standard error of the estimate of the regression error,
$V(\hat{b})$ is the variance of the regression coefficients,
R is the multiple correlation coefficient from the regression,
$\bar{Y}$ is the average of the aim responses.

Block 118 shows that the refined coefficients, b, are automatically loaded into the algorithm by control unit 54 of FIG. 1 and used in subsequent printing. Installation of the newly revised and now current $[X'X]^{-1}$ into the $h_i^*$ calculations is done in Block 120, and in Block 122 the other quantities, SEE, $V(\hat{b})$, and R (or $R^2$) are stored for recall by algorithm optimization experts if needed for diagnostic purposes. The storage for the new values of X, Y, and $N_{new}$ are then zeroed in Block 124. Or if the equivalently useful X'X, X'Y, Y'Y and N are used, then they are zeroed in Block 124a. Finally the control system is readied for the next negative in Block 126.

This procedure permits each photofinishing station to obtain optimum performance from its algorithm given the population of negatives that are being processed during certain intervals of time, the processing materials and conditions in use, and the operator's or the average customer's preferences. It takes automatic advantage of the reprinting that is being done to meet production standards. It requires no additional skills for an operator who is trained to make reprints to meet those standards. While, it does require some additional reprinting that would not ordinarily have to be done to meet the standards, the acceptance range for the $h_i^*$ statistic can be set so that a only very small fraction of all negatives need to be reprinted, and even these do not actually have to be reprinted if the operator temporarily chooses not to do so. Furthermore, because this is one of the most efficient processes for selecting negatives for use in the algorithm optimization process, it makes very efficient use of the extra time and effort that is expended.

The invention has been described in detail with particular reference to a preferred embodiment thereof, but it will be understood that variations and modifications can be effected within the spirit and scope of the invention. Such variations could include, but are not limited to, use in electrostatic copiers which make color prints and use in imaging systems which make use of a digital intermediary in the imaging chain and which create hard copy output such as prints or softcopy output such as video images.

We claim:

1. A method of controlling the exposure of negatives in a photographic printer, comprising the steps of:
   (a) scanning each negative to provide red, green and blue density information;
   (b) producing prints of such negatives employing such density information in a color exposure determining algorithm having at least one neutral density equations with coefficients and at least two chromaticity equations with coefficients;

(c) computing a statistic from each negative's density data based on the diagonal element from the algorithm's hat matrix;

(d) alerting the operator that a negative should be critically reprinted whenever its computed statistic lies within an adjustable "selection" range;

(e) automatically identifying the prints made from the negatives whose computed statistics lies within the "selection" range;

(f) selecting the identified prints and providing precise density and color balance corrections;

(g) reprinting negatives from the selected identified prints using the precise corrections;

(h) automatically examining all reprinted negatives for suitability of use for recalculating the algorithm's coefficients and selecting those negatives which lie in one adjustable and one nonadjustable range for the hat statistic;

(i) computing the X'X, the X'Y and X'Y matrices for all the selected negatives;

(j) adding an adjustable fraction of the new X'X, the new X'Y, and the new Y'Y matrices tot he corresponding current matrices and recomputing the algorithm coefficients, b̂, when the number of new frames exceeds an adjustable number;

(k) installing and using the new coefficients in the corresponding equations; and (l) using the newly formed X'X matrix to continue to compute the hat statistic and begin to accumulate new values for the new X'X, the new X'Y and the new Y'Y matrices.

2. The method of claim 1 wherein a auditory signal is used to alert the operator that a negative is being printed whose hat statistic falls in the acceptance range.

3. The method of claim 1 wherein a visual signal is used to alert the operator that a negative is being printed whose hat statistic falls in the acceptance range.

4. The method of claim 1 wherein a backprinter is used to identify the prints made from negatives whose hat statistic falls in the acceptance range.

5. The method of claim 1 wherein prints made from negatives whose hat statistic falls in the acceptance range are offset from those that fall outside the acceptance range.

6. The method of claim 1 further including the steps of computing certain regression diagnostic parameters such as the standard error of the estimate for the regression model, the variance of the new coefficients and the multiple correlation coefficient for the regression, and storing such regression diagnostics for examination by qualified analysts.

7. The method of claim 1 in which step (d) is modified by alerting the operator that a negative should be critically reprinted an adjustable fraction of those occurrences when the computed statistic lies within a fixed "selection" range and should always be reprinted when the statistic lies within the adjustable "selection" range.

* * * * *